(12) United States Patent  (10) Patent No.: US 8,024,983 B2
Ellsworth  (45) Date of Patent: *Sep. 27, 2011

(54) BELT CONVEYING TENSION MEASURING SYSTEM

(75) Inventor: Clayton S. Ellsworth, Norfolk, NE (US)

(73) Assignee: EBM Properties Inc., Norfolk, NE (US)

( * ) Notice: Subject to any disclaimer, the term of this patent is extended or adjusted under 35 U.S.C. 154(b) by 261 days.

This patent is subject to a terminal disclaimer.

(21) Appl. No.: 12/481,905

(22) Filed: Jun. 10, 2009

(65) Prior Publication Data

US 2009/0255348 A1  Oct. 15, 2009

Related U.S. Application Data

(63) Continuation-in-part of application No. 12/019,159, filed on Jan. 24, 2008, now Pat. No. 7,806,004.

(51) Int. Cl.
*G01L 1/04* (2006.01)
(52) U.S. Cl. .................................................. 73/862.453
(58) Field of Classification Search ............. 73/862.453, 73/862.194
See application file for complete search history.

(56) References Cited

U.S. PATENT DOCUMENTS

| | | | |
|---|---|---|---|
| 1,326,532 A | 12/1919 | Rosner | |
| 1,650,603 A | 11/1927 | Burton | |
| 2,463,273 A | 3/1949 | Holstein | |
| 2,795,136 A | 6/1957 | Matt | |
| 3,324,960 A | 6/1967 | Bauer et al. | |
| 3,387,721 A | 6/1968 | Ludwig | |
| 3,564,913 A * | 2/1971 | Evans et al. | 73/862.453 |
| 3,655,031 A | 4/1972 | Cahn | |
| 3,760,934 A | 9/1973 | Olson | |
| 4,171,640 A | 10/1979 | Van Mastrigt | |
| 4,475,648 A | 10/1984 | Weeks | |
| 4,860,597 A | 8/1989 | Fenech | |
| 5,009,273 A | 4/1991 | Grabinski | |
| 5,030,173 A | 7/1991 | Bryant | |
| 5,441,483 A | 8/1995 | Avitall | |
| 5,526,921 A | 6/1996 | Kovalak et al. | |
| 5,561,274 A | 10/1996 | Brandorff | |
| 5,641,057 A | 6/1997 | Chorlton | |
| 5,877,456 A | 3/1999 | Homer, III et al. | |
| 6,075,678 A | 6/2000 | Saliba | |
| 6,134,977 A | 10/2000 | Wessels | |
| 6,637,342 B1 | 10/2003 | Jennings et al. | |

* cited by examiner

*Primary Examiner* — Lisa Caputo
*Assistant Examiner* — Octavia Davis (57) ABSTRACT

A belt conveying tension measuring system for measuring applied take-up tension on a belt of a bucket elevator or a belt of a conveyor. The tension measuring system includes a center assembly that is used in combination with a pushing assembly and a horizontal stabilizer assembly such that when a deflection operating assembly is used actuation of the deflection operating assembly causes the pushing assembly to provide deflection to the belt of the conveyor. The pressure to deflect the belt a set amount is measured with and set by a load cell and scale assembly.

9 Claims, 8 Drawing Sheets

BELT CONVEYING TENSION MEASURING SYSTEM

CROSS REFERENCE TO RELATED APPLICATION

This application is a continuation-in-part of application Ser. No. 12/019,159 filed Jan. 24, 2008.

BACKGROUND OF THE INVENTION

This invention relates to belt conveyors and bucket elevators. More specifically, this invention relates to a tension measuring system for belt conveying and bucket elevator-type devices.

Belt conveyors and bucket elevators have been used to transport materials for many years. Proper tensioning of the belt is important to prevent slippage from occurring between the driving pulley and a belt. As a result, required tensioning formulas have been used for years to provide proper tension for the belt. However, measuring the tension has been limited to very high end cost solutions. As a result a simplified solution is needed in the art to improve the method of measuring tension applied to the belt for belt conveying and bucket elevator-type devices.

Therefore, a principal object of the present invention is to provide a belt conveying tension measuring system to obtain the amount of tension that has been applied a belt of a bucket elevator.

Yet another object of the present invention is to provide a low cost means for providing the amount of applied tension added by take-up to a belt of a bucket elevator.

These and other objects, features, or advantages of the present invention will become apparent from the specification and claims.

BRIEF SUMMARY OF THE INVENTION

A belt conveying tension measuring system that has a center assembly with first and second tube members that extends from a first end to a second end. A pushing assembly is connected with the center assembly at a first end while a belt horizontal stabilizer assembly is interlocked with the center assembly at the second end. Horizontal rollers are placed behind the belt horizontal stabilizer assembly at the top and at bottom of side plates wherein the rollers hold a conveyor belt in a straight plane. A deflection operating assembly having an actuating member is then disposed within the first end of the belt horizontal stabilizer and the center assembly to provide an actuating force to the belt. Thus, when the pushing assembly engages the conveyor belt the deflection operating assembly can be actuated in order to actuate the pushing assembly and deflect the tension on the belt to a set amount. This force is applied to a load cell connected to actuating assembly. The load cell is connected to a scale by way of low voltage wiring. The signal is then processed into a reading that is recorded as a deflection reading. The deflection operating assembly is then adjusted to increase or decrease the take-up tension to obtain a set reading on scale to match an amount obtained from a formula provided with the tension measuring system.

DETAILED DESCRIPTION OF THE PREFERRED EMBODIMENT

Figure 1:
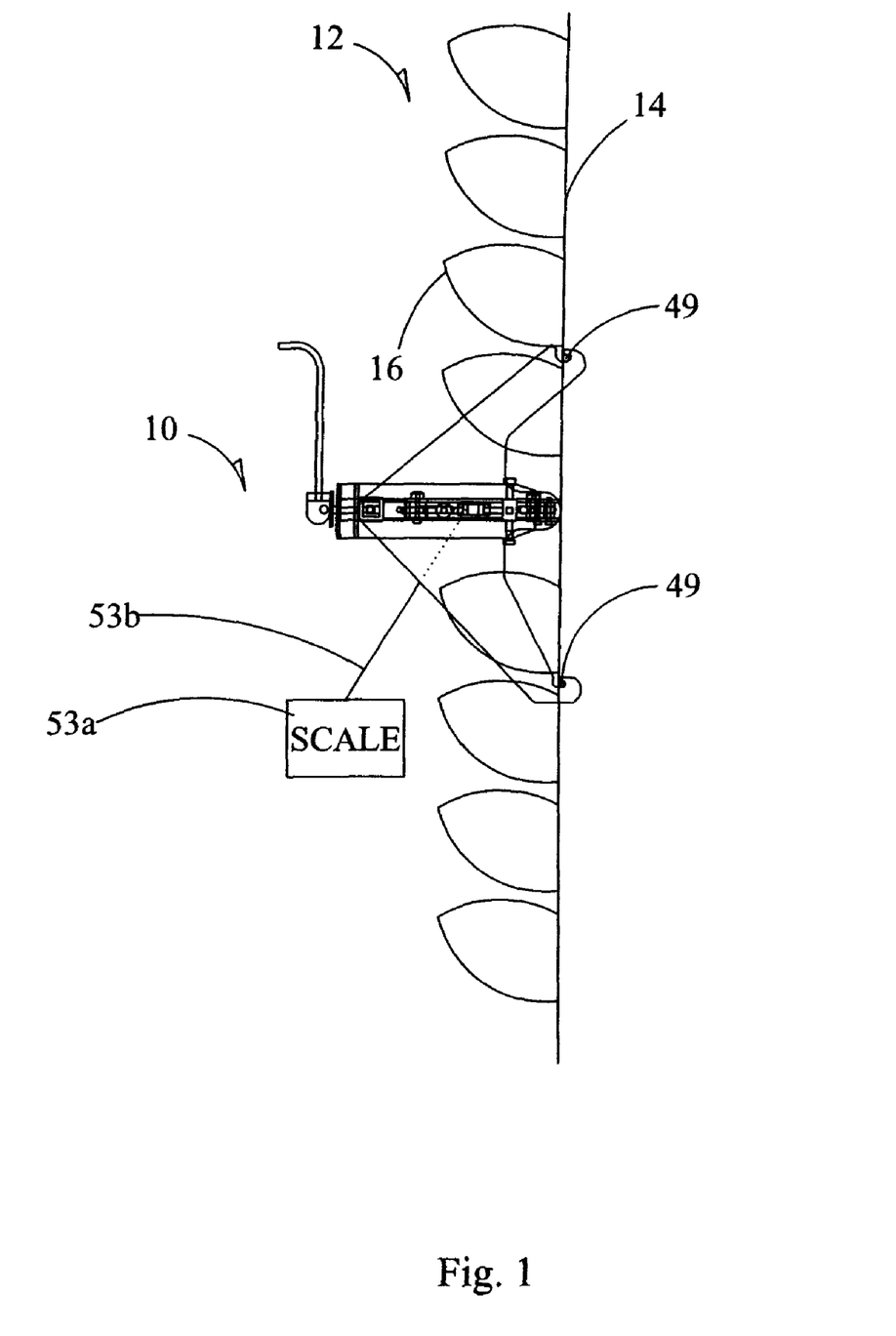
FIG. 1 is a belt conveying tension measuring system that engages a bucket elevator or conveyor belt.
Figure 2:
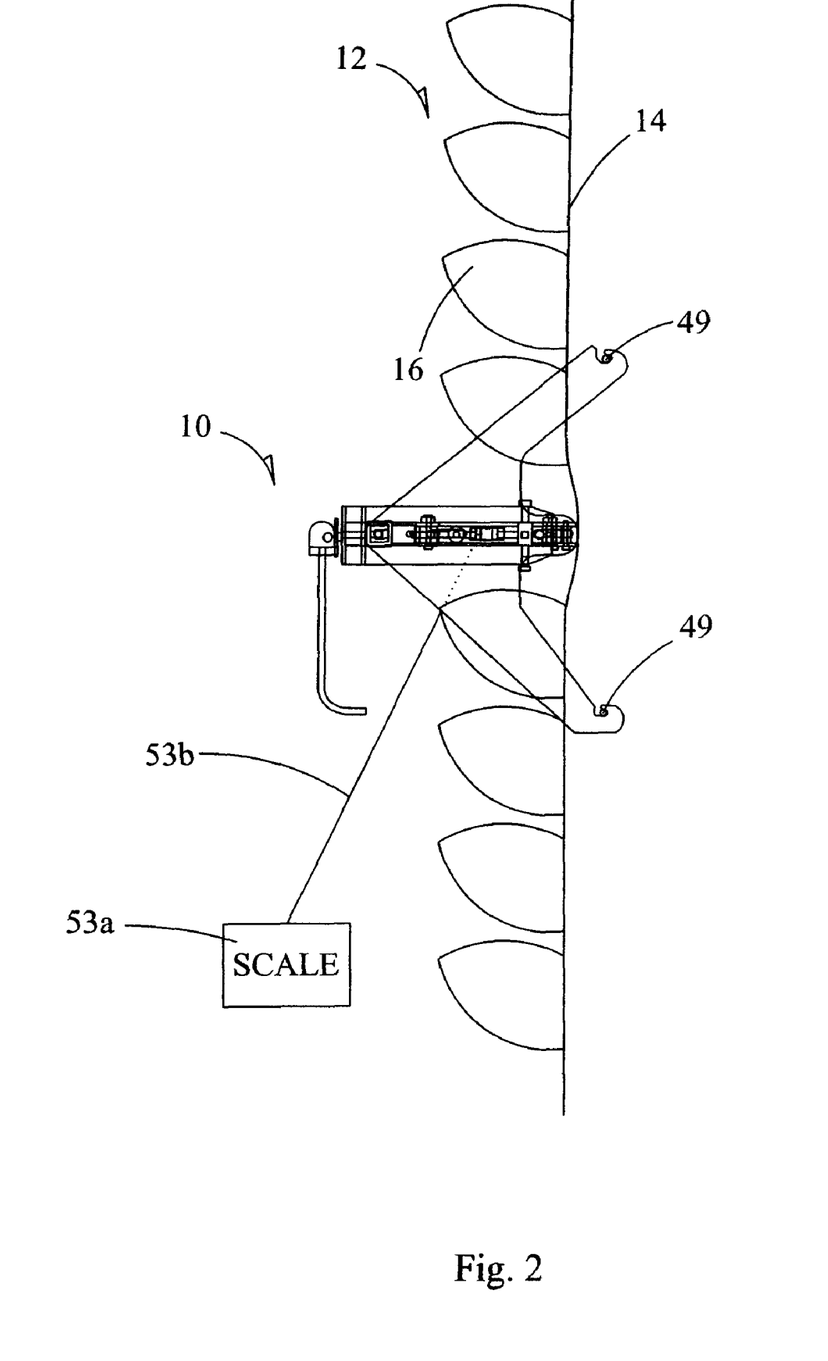
FIG. 2 is a belt conveying tension measuring system that is actuated to provide deflection to a belt used in a conveyor or an elevating leg.

FIGS. 1 and 2 show a belt conveying tension measuring system 10 that is associated with a belt conveying or bucket elevator-type device 12. The belt conveying tension measuring system 10 engages a belt 14 of the bucket elevator 12 to provide a deflection force thereon. The bucket elevator 12 additionally has a plurality of elevator buckets 16 attached to the belt 14 used to convey product.

Figure 3:
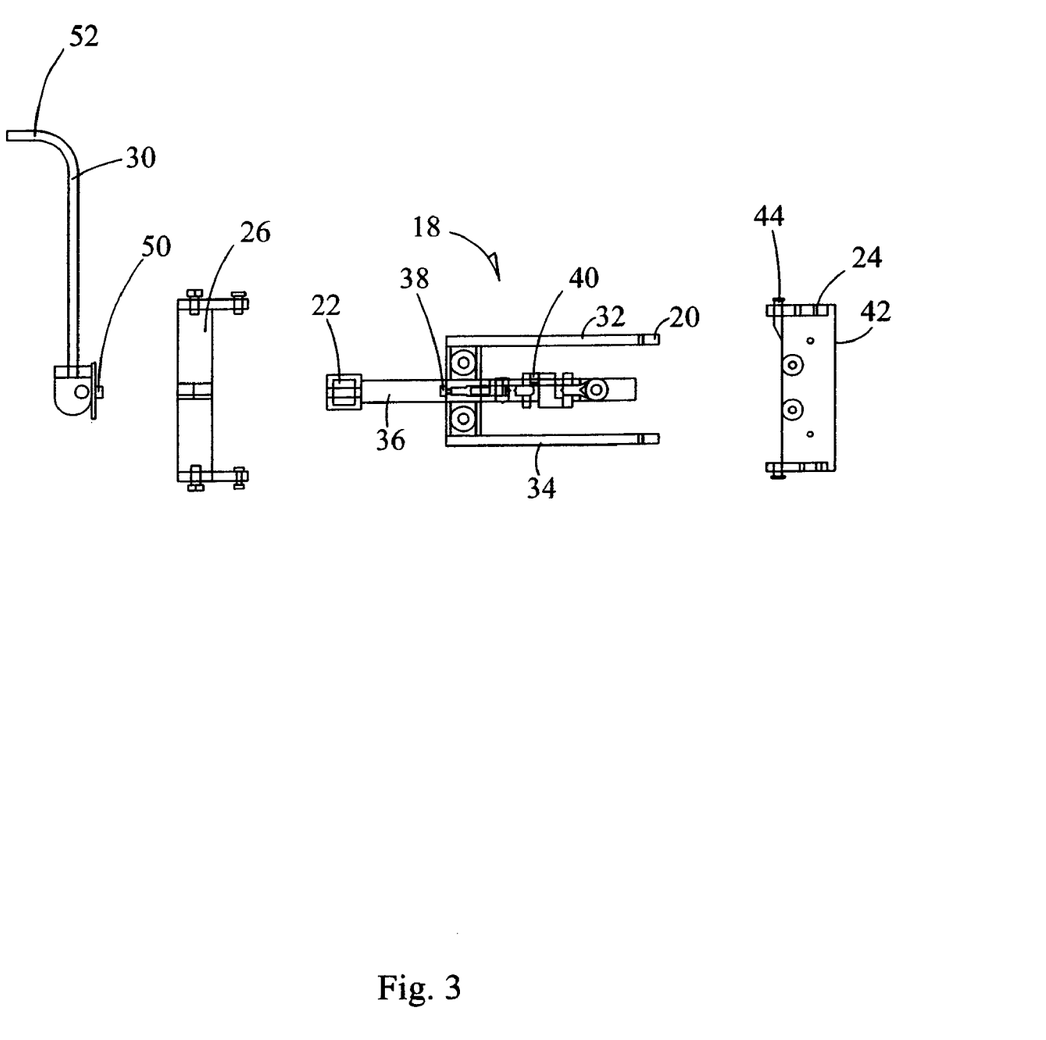
FIG. 3 is a top exploded plan view of a belt conveying tension measuring system.
Figure 4:
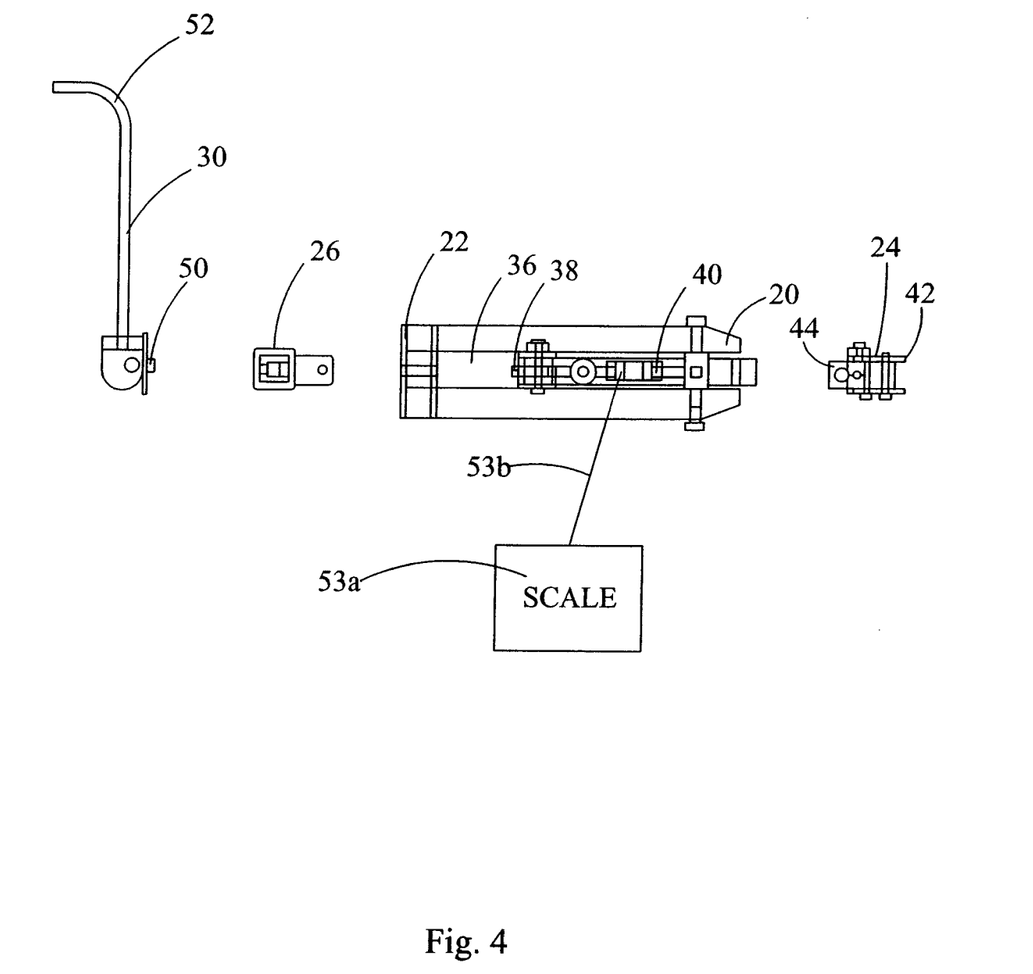
FIG. 4 is a side exploded plan view of a belt conveying tension measuring system.
Figure 5:
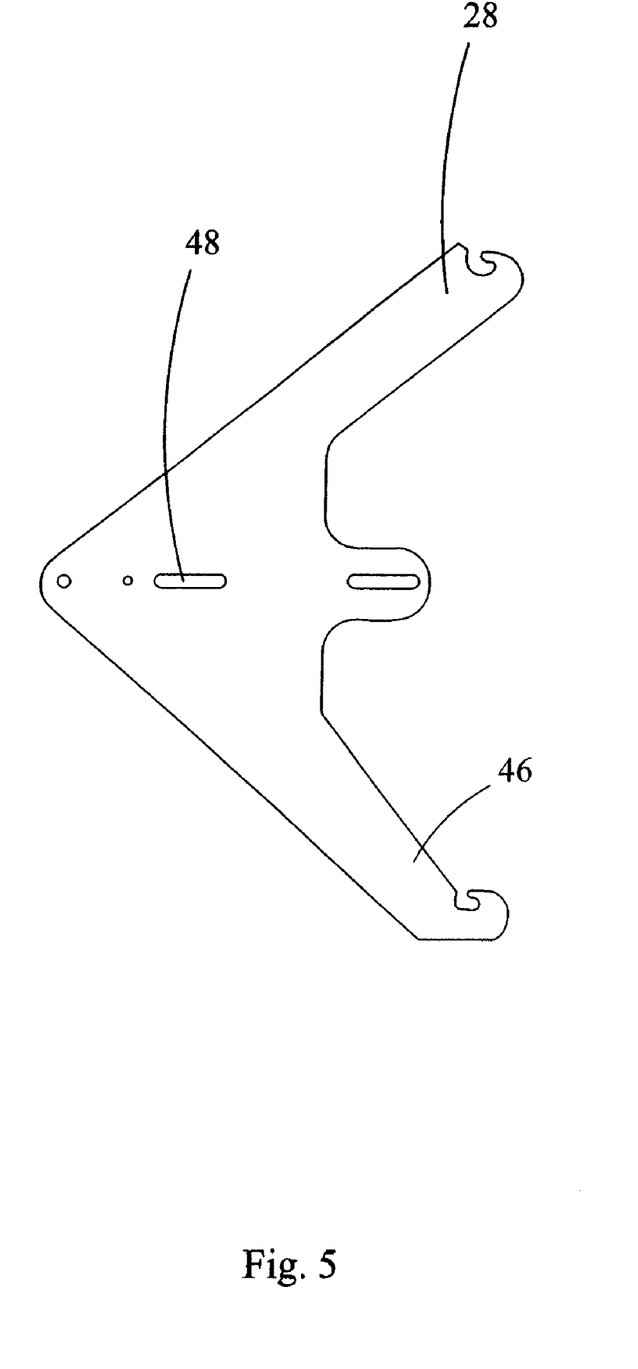
FIG. 5 is a side plan view of side panels of a belt conveying tension measuring system.

FIGS. 3-5 show in detail the components of the belt conveying tension measuring system 10. Specifically, the belt conveying tension measuring system 10 includes a center assembly 18 that extends from a first end 20 to a second end 22. A tensioning assembly 24 is interlocked to the first end 20 of the system 10 and a belt horizontal stabilizer 26 is attached and interlocked to the second end 22. In the embodiment of FIGS. 1-5 the tensioning assembly 24 is a pushing assembly whereas the embodiment of FIGS. 6-8 the tensioning assembly 24 is a pulling assembly. Side panels 28 extend between and are secured to the pushing assembly 24 and belt horizontal stabilizer assembly 26. A deflection operating assembly 30 is then disposed within the belt horizontal stabilizer 26 and center assembly 18 to provide an actuating force.

As stated above, the center assembly 18 extends from a first end 20 to a second end 22. The center assembly 18 has first and second flats 32 and 34 that extend in parallel spaced relation containing a center member 36 therebetween. Extending on and attached to the center member 36 is a tensioning screw 38 that is operatively connected to an S-shaped load cell 40 in order to provide tension and force in association with the center member 36.

The tensioning assembly 24 is interlocked and secured to the first end 20 of the center assembly 18 about the center member 36 at a first end 42. The load cell 40 is connected to the tensioning assembly 24 to sense force created by the tensioning assembly 24. The tensioning assembly 24 additionally engages the belt 14 of the elevator leg belt 12 at a second end 44 to provide a deflection force.

The horizontal stabilizer assembly 26 is attached adjacent the second end 22 of the center assembly 18. Like the tensioning assembly 24 the horizontal stabilizer assembly 26 connects to the center member 36 and provides horizontal stabilization of the entire system 10.

Side panels 28 generally are V-shaped having panel arms 46 that extend beyond the belt 14 of the conveyor 12. Additionally, a plurality of slots 48 within the side panels 28 allow for the side panels 28 to be attached to and extend between the tensioning assembly 24 and horizontal stabilizer assembly 26. Two horizontal rollers 49 are inserted into side panels 28 on back side of belt 14 to hold the belt from deflecting above or below rollers 49.

The deflection operating assembly 30 is an inverted S-shaped load cell containing to an actuating member 50 that extends into and through both the horizontal stabilizer assembly 26 and the center assembly 18. The deflection operating assembly 30 additionally has a handle 52 that provides for rotation about the actuating member 50. Rotation about the actuating member 50 via handle 52 creates movement of the tensioning assembly 24 to provide deflection to belt 14.

Figure 6:
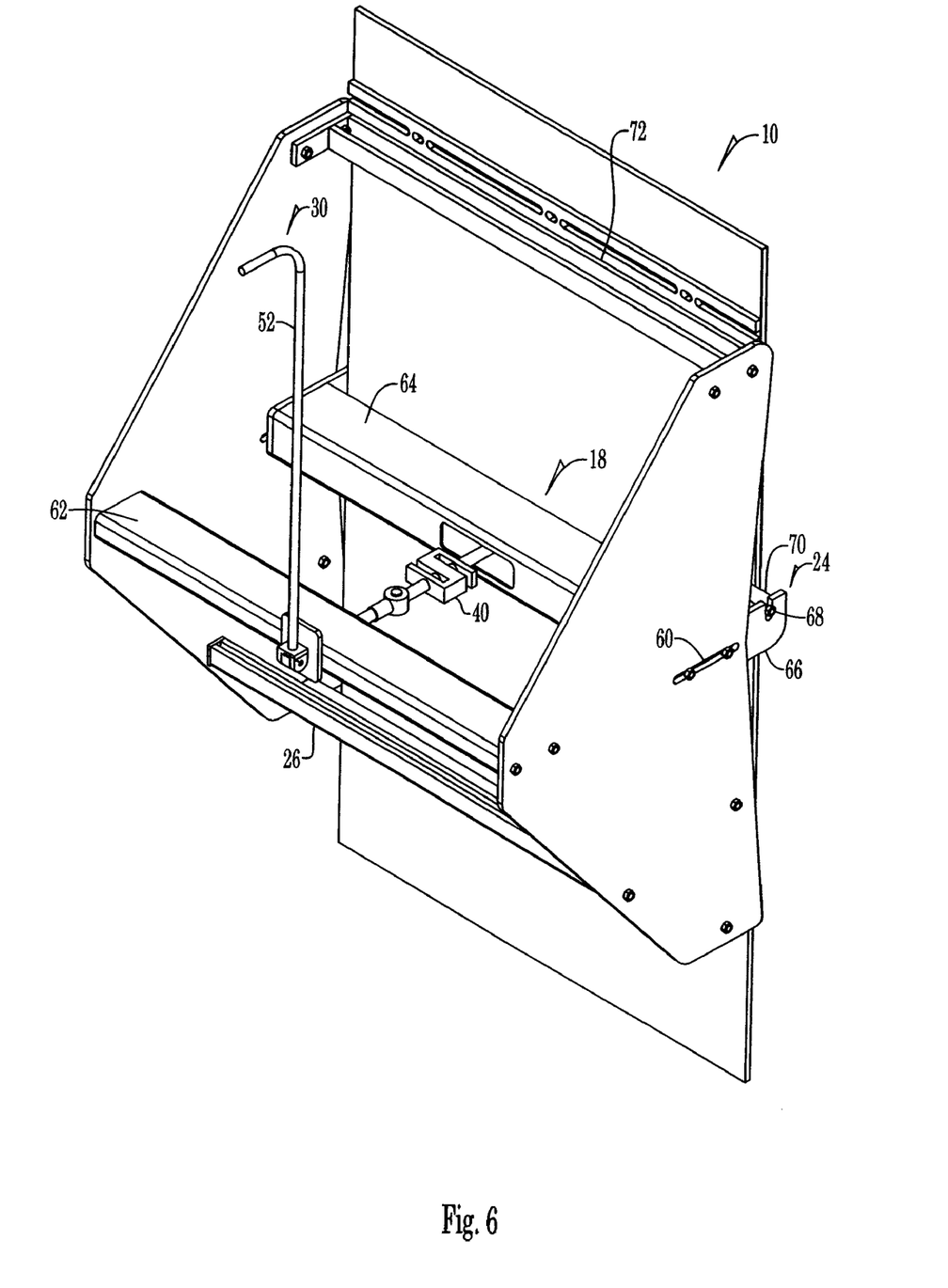
FIG. 6 is a perspective view of an alternative embodiment of a belt conveying tension measuring system.
Figure 7:
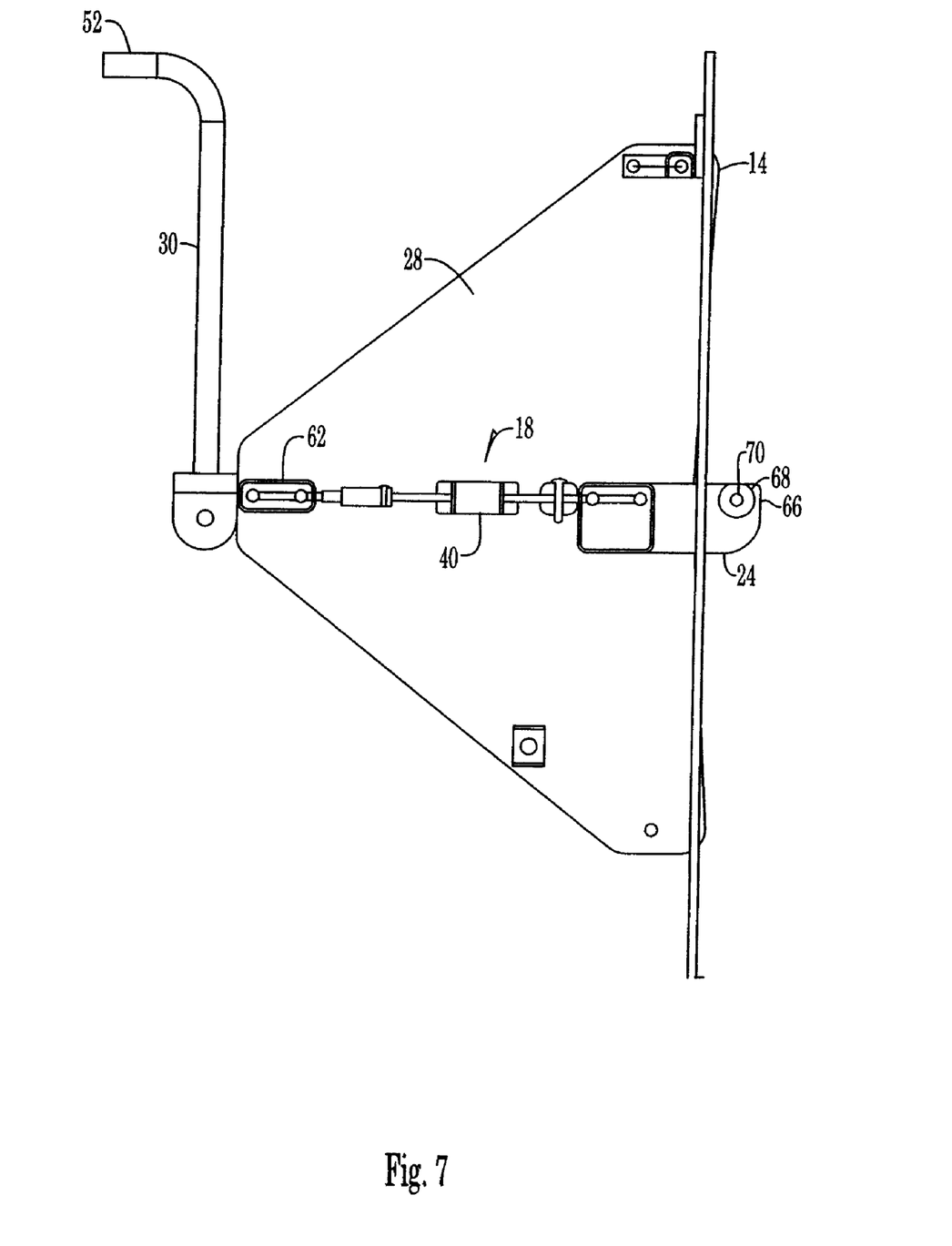
FIG. 7 is a side plan view of an alternative embodiment of a belt conveying tension measuring system.
Figure 8:
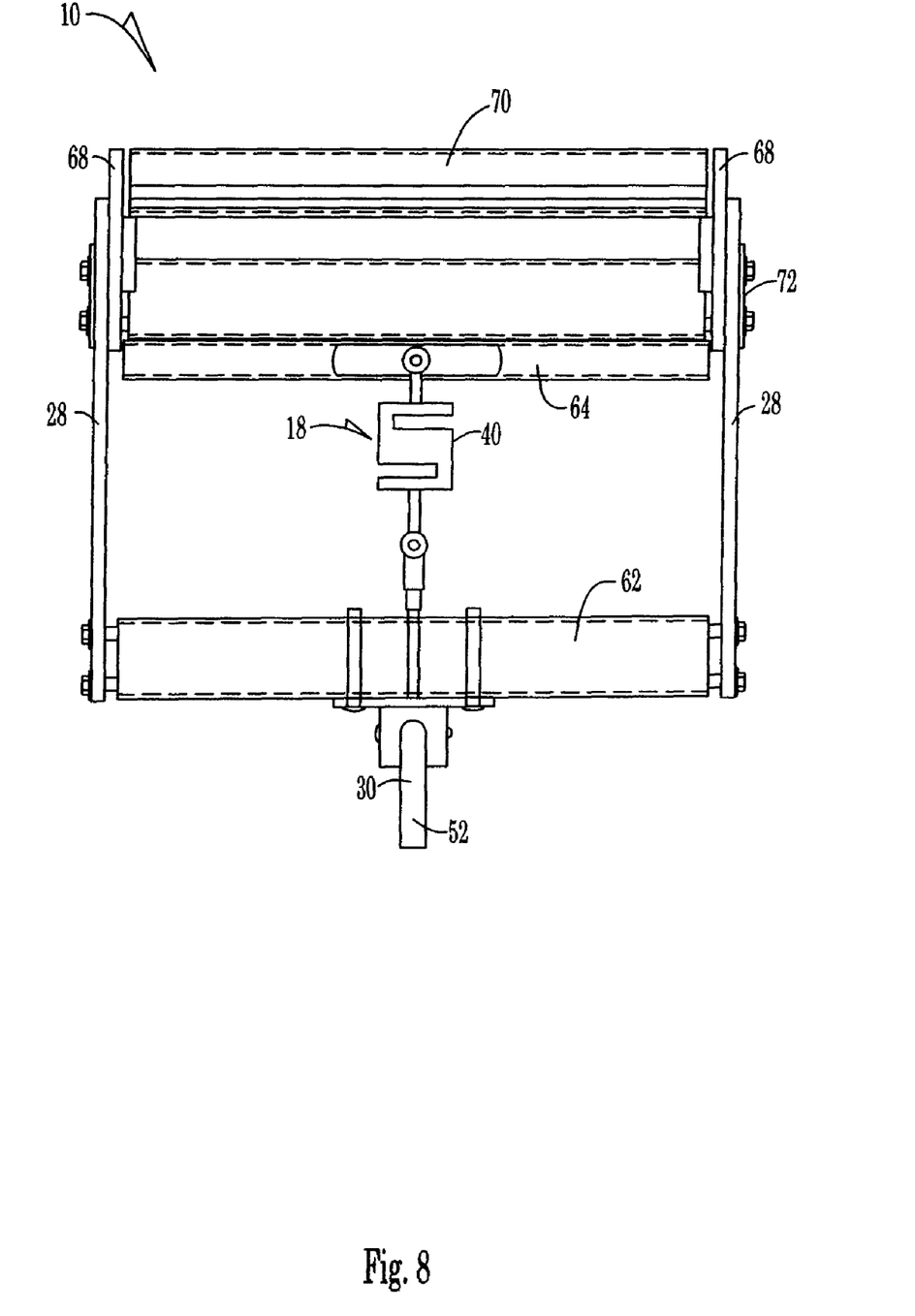
FIG. 8 is a top plan view of an alterative embodiment of a belt conveying tension measuring system.

FIGS. 6-8 present and alternative embodiment of the belt conveying tension measuring system 10. In this embodiment the tensioning assembly 24 is a pulling assembly that pulls the belt 14 to create the tension in the belt that is measured by the system 10. As shown in the figures presented is the deflection operation assembly 30 that includes handle 52 and actuating member 50. Attached to the deflection operation assembly 30 are the side panels 28 that has a slot 60 disposed therethrough. Unlike the side panels 28 of the first embodiment the side panels of this embodiment do not have arms and present a more continuous body. In this embodiment also secured between the side panels 28 is a deflector mount assembly 62 that is secured to the deflection operation assembly 30. Specifically, in this alternative embodiment the horizontal stabilizer assembly 26 is disposed between the side panel 60 and in parallel spaced relation to the deflector mount assembly 62.

Secured to the deflector mount assembly 62 is the center assembly 18 that includes load cell 40. As with the first embodiment the load cell 40 of center assembly 18 is connected to the tensioning assembly 24 in order to detect the force or a load provided by the tensioning assembly 24 on the belt.

The tensioning assembly 24 of this embodiment has a bracket 64 that extends between the panels 28 and is connected to the center assembly 18. Extending from the bracket in parallel spaced relation are a pair of arms 66 each of which contain a slot 68 that aligns so that a roller 70 may be placed within the slots 68 and extend in parallel spaced relation from the brackets 64. The roller 70 engages the belt 14 to place tension on the belt as required.

A belt mount assembly 74 is disposed within the tensioning assembly 24 between the bracket 64, roller 70 and the side panels 28. The belt mounting assembly 74 comprises a flat sheet that is utilized to mount the belt conveying tension measuring system to the tensioning belt 14.

In operation the belt conveying tension measuring system 10 is positioned adjacent the belt 14 of conveyor 12 such that the tensioning assembly 24 is in engagement with the belt 14. The deflection operating assembly 30 is then rotated via handle 52 about actuating member 50 in order to actuate the tensioning assembly 24 to apply the deflection upon belt 14 as best shown in FIGS. 1, 2, and 8. This force is thus applied to the load cell 40 that is connected to and in communication with a scale 53a via low voltage wiring 53b. The signal is then processed into a reading that is recorded as a deflection reading. The deflection operating assembly 30 is then adjusted to obtain a scale reading to reach a predetermined amount calculated from a known formula.

In the first embodiment when the deflection operating assembly 30 is rotated the tensioning assembly 24 is pushed forward to engage the belt 14 to create the desired tension to be measured by the load cell 40. Alternatively, in the embodiment as seen in FIGS. 6-8 when the deflection operating assembly 30 is rotated the tensioning assembly 24 is pulled toward the deflection operating assembly 30. Specifically, the bracket 64 is attached with fasteners within the slots 60 of panel 28 so that as the tensioning assembly 24 is pulled toward the deflection operating assembly 30 the tensioning assembly 24 is able to move the length of the slot 60 to place tension on belt 14.

By using the belt conveying tension measuring system 10 flat belt users are enabled to install the tension measuring system 10 on a belt 14 that is not running and set a predetermined amount of deflection pressure. The amount of pressure required is obtained from using existing formulas and applying a correction factor which is established using test weights pulling downward on belting with the tension measuring system 10 deflecting the belt 14 in a constant amount.

Thus, the use of the tension measuring system 10 measures the applied take-up tension added to the belt and conserves energy by reducing slipping. By maintaining belt speed results in conveying and elevating efficiency. Additionally, as a result damaging components such as bearings from excess applied take-up tension is eliminated by use of the tension measuring system 10. Further, the tension measuring system 10 can be used to check effective applied take-up pressure of gravity and automatic take-ups; however, the system 10 is primarily used when manual take-ups are used to set required take-up tension on conveyors and elevator legs. Therefore, provided is a cost effective manner of providing the amount of applied take-up tension applied to a belt of a conveyor system. As a result, at the very least, all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A belt conveying tension measuring system comprising:
    a center assembly extending from a first end to a second end;
    a tensioning assembly connected to the center assembly at the first end of the center assembly;
    a deflection operating assembly disposed within the second end of the center assembly;
    wherein the tensioning assembly engages a conveyor belt such that when the deflection operating assembly is actuated the tensioning assembly deflects a belt of a conveyor to a set amount.

2. The belt conveying tension measuring system of claim 1 wherein side panels interlock and extend between the tensioning assembly and a horizontal stabilizer assembly.

3. The belt conveying tension measuring system of claim 1 wherein the deflection operating assembly has a handle that rotates about an actuating member.

4. The belt conveying tension measuring system of claim 3 wherein rotation of the handle actuates the deflection operating assembly.

5. The belt conveying tension measuring system of claim 1 wherein the center assembly has a load cell that produces a signal used to determine a deflection amount.

6. The belt conveying tension measuring system of claim 5 wherein the load cell is in communication with a scale to determine the deflection amount.

7. The belt conveying tension measuring system of claim 6 wherein the deflection amount is set using preexisting formulas.

8. The belt conveying tension measuring system of claim 1 wherein the tensioning assembly comprises a bracket having arms in parallel spaced relation wherein a roller is received by the arms and engages the belt of the conveyor.

9. The belt conveying tension measuring system of claim 8 wherein when actuated the deflection operating assembly pulls the tensioning assembly toward the deflection operating assembly.

* * * * *